Nov. 29, 1966     C. J. N. HARDY     3,287,969
LOG FOR INDICATING VELOCITY OF MOTION OF WATERCRAFT
Filed Jan. 17, 1964
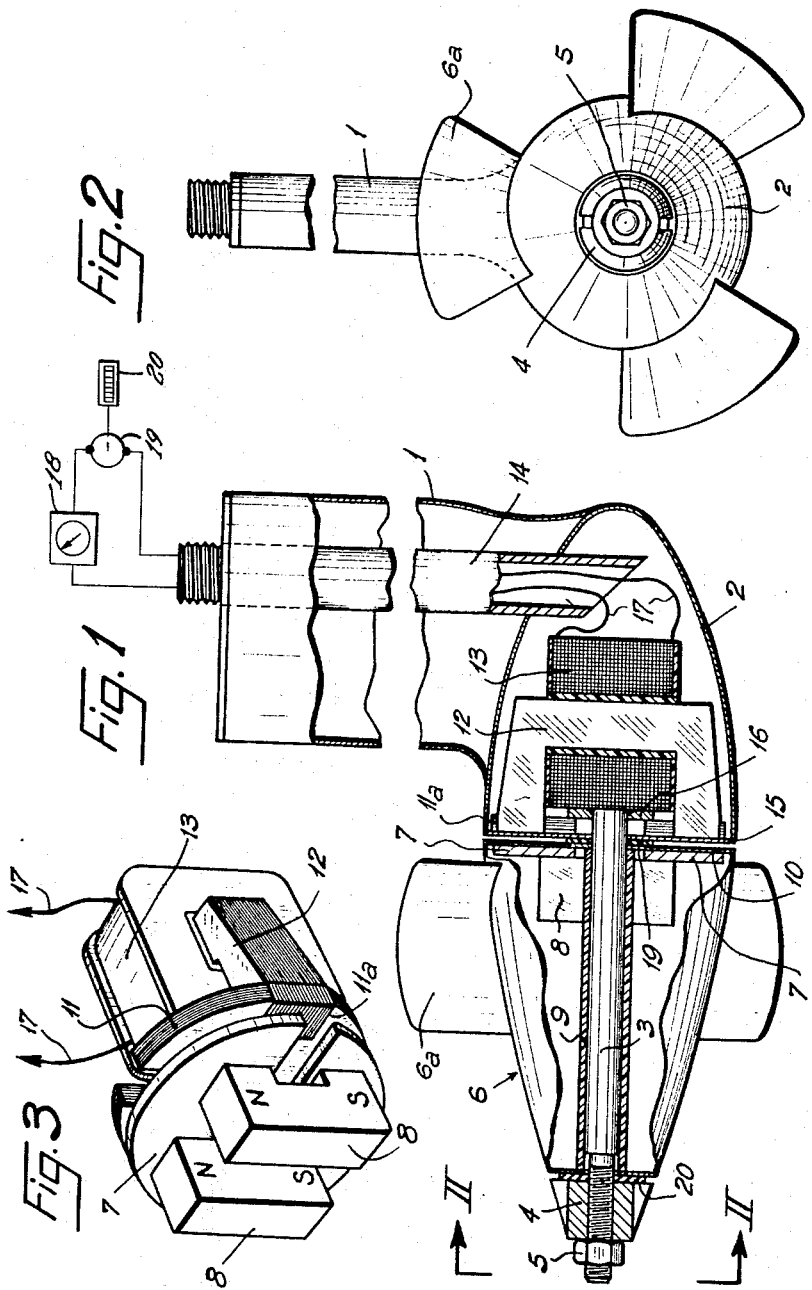
INVENTOR
Constant Joseph Nicolas Hardy
BY
ATTORNEY

United States Patent Office 3,287,969
Patented Nov. 29, 1966

3,287,969
LOG FOR INDICATING VELOCITY OF MOTION OF WATERCRAFT
Constant Joseph Nicolas Hardy, Colombes, Seine, France, assignor to Societe d'Etudes Pour l'Utilisation des Matieres Plastiques Dans l'Industrie (S.E.U.P.I.), Boulogne-sur-Seine, France, a company of France
Filed Jan. 17, 1964, Ser. No. 338,447
Claims priority, application France, Jan. 25, 1963, 922,696/63
6 Claims. (Cl. 73—187)

This invention relates to logs for indicating the velocity of motion of water craft. Such a device usually comprises an impeller screw mounted for rotation in the water and carried bodily forward with the craft, and means for indicating the angular velocity of rotation of the screw as a measure of the linear velocity of the craft. Counter means are frequently also provided for counting the number of revolutions effected by the screw over a given period of time as an indication of the distance travelled by the craft over that period.

In conventional log devices, especially as used in yachts and other small craft, the means for transmitting the angular velocity signal from the rotating submerged log screw to an indicator instrument aboard the craft have usually been provided in the form of a flexible cable or wire and the indicating instrument was a drum counter or the like, the arrangement being somewhat similar to that of the speedometer of a motor vehicle. It is an object of the present invention to provide improved means for remotely transmitting the angular velocity indication from a submerged log to an electrical indicating instrument aboard the craft. An object is to provide an improved electric log construction, especially suitable for yachts and other small craft, which will be simple and economical to build, install and operate, reliable and long-lived despite the insulation and other difficulties encountered in operating electrical apparatus in submerged condition.

In ccordance with an aspect of the invention, a log device comprises a casing adapted to be supported in submerged condition from a craft, a shaft rotatable in the casing, an impeller screw secured to the shaft for rotation by the relative motion of the craft and casing through the water, a permanent magnet mounted for bodily rotation with the screw, a winding mounted fixedly within the casing in inductively coupled relation with the magnet so as to have an alternating electric signal induced therein on rotation of the screw, an electrical indicating instrument, and conductor means connected to the winding and the instrument for indicating said signal as a measure of craft velocity. Preferably the screw and the casing are provided in the form of respective moldings of plastic insulating material, the screw being molded about the permanent magnet, and the casing being molded about the winding.

The frequency and voltage characteristics of the alternating current generated by the winding are both proportional to the angular velocity of the magnet and screw, and can hence be used to actuate an appropriate indicating instrument for indicating the instantaneous velocity of the craft, as well as the distance covered thereby through integration of the characteristic over time.

An exemplary embodiment of the invention will now be described in detail, by way of illustration but not of limitation, with reference to the accompanying drawings wherein:

FIG. 1 is a longitudinal sectional view of a log according to the invention, partly broken away.

FIGURE 2 is an end view as seen on the line II—II, FIGURE 1, and

FIGURE 3 is a perspective view of the A.-C. generator part of the improved log assembly shown in FIGURE 1.

The illustrated log assembly comprises a supporting stem 1 of molded plastic material having a faired contour in horizontal cross section, and adapted to be secured at its upper end from the hull of a craft, e.g., by means of a threaded attachment or otherwise. Molded integrally with the lower end of the supporting stem 1 is a fair-shaped casing 2 having a flat transverse end wall 15 directed aft of the craft. A fixed shaft 3 projects from the end wall of casing 2, and rotatably supports a tube 9, made e.g., of super-polyamid. Molded around tube 9 is a faired member 6 of plastic material which constitutes the hub of an impeller screw having the vanes 6a, herein three in number, projecting radially from it. The impeller hub 6 has a flat transverse end wall plate 10 spaced axially from the casing end wall plate 15 by means of one or more spacer washers such as 19. The impeller 6–6a is retained on the shaft 3 by means of a nut 4 and locknut 5 screwed around a threaded end section of the shaft 3, with a washer 20 being interposed between the end wall of hub 6 and nut 4.

The plastic hub member 6 is molded around a magnetic rotor assembly which comprises a pair of spaced part-circular plates 7, 7a (see FIGURES 1 and 3) of ferro-magnetic material interconnected by a pair of U-shaped permanent magnet members 8. Both magnet members 8 are magnetized in the same direction, as indicated by the north and south poles N and S in FIGURE 3, and their magnetization should preferably be identical. For this purpose both magnets 8 are preferably simultaneously magnetized to saturation after assembly with the part-circular plates 7, 7'. If desired, the pair of members 8 may be replaced by a common magnetic member perforated for the passing of shaft 3 and tube 9 through it.

It will be noted that with this arrangement the magnetic assembly 7–8 as well as the rotatable bearing tube 9 are imbedded in the electrically insulating plastic material from which the impeller screw 6–6a is molded, which may be a polyester, an epoxy resin or other suitable rigid moldable syntheitc material. The end wall 10 is made of relatively thin insulating plastic material, and is applied against the surfaces of the part-circular plates 7, so that the entire magnetic assembly is effectively protected from contact with the surrounding water.

The magnetic rotor structure just described cooperates with a stator structure which comprises a pair of laminations 11 each in the form of a semi-circular laminated assembly, having mutually opposed notches 11a in which are inserted the extremities of a U-shaped lamination 12, which together with the laminations 11 constitutes a magnetic core for a stator winding 13, fitted around the cross-leg of the U-shaped lamination 12. Lead-out conductors 17 connected with the ends of the winding 13 extend through a tube 14 extending through the stem 1. It will be understood that stem 1 and fairing 2 form an integral molding of plastic material, such as polyester or epoxy resin, around the tube 14 and the electromagnetic stator assembly including core 11–12 and winding 13 both imbedded therein. The molded plastic shell together with the thin insulating end plate 15 engaging the outer surface of the laminations 11 serve to protect the electromagnetic assembly against contact with the surrounding water. At the same time, the plastic molding comprising the fairing 2 serves to retain the end part of the projection fixed shaft 3, by means of a flange 16 secured to the end of the shaft and imbedded in the molded plastic. It will be noted that the airgrap defined between the stationary and revolving parts of the magnetic circuit is determined mainly by the thickness of the annular spacer or spacers 19. At the opposite end of the revolving structure the washer 20, made of superpolyamid or the like, forms a water-lubricated end thrust bearing for the hub 6.

The shaft 3, which is the only metallic part of the whole structure which contacts the water, may be made of bronze or other suitable alloy.

The ends of the conductors 17, on board the craft, may be connected to any suitable indicating instrument responsive the voltage or frequency of the alternating current induced in the winding 13 on rotation of the screw 6–6a in the water stream. Thus, the leads 17 may be connected by way of a rectifier with a voltmeter or a low-power milliammeter having a dial calibrated in units craft velocity, e.g., knots, to indicate the instantaneous speed of the craft. In a modification the rectifier may be omitted and a polarized indicating instrument 18 used. Preferably also the conductors 17 are connected in series or in parallel relation with the input of a synchronous motor 19 having its output shaft arranged to drive a totalizing counter 24 so as to indicate the integrated velocity, i.e., distance covered by the craft, and which may be calibrated in nautical miles.

It will be understood that various modifications may be made in the illustrated embodiment of the invention without departing from the scope thereof.

What I claim is:

1. A log system comprising a first plastic molding constituting a fixed support including a faired member and an integral stem projecting upward therefrom for attachment to a water craft, and a second plastic molding comprising an impeller hub having integral impeller blades projecting outward therefrom for rotation by the motion of said craft through the water, A.-C. generating means including a permanent magnet rotor imbedded in said plastic hub and a stator winding imbedded in said faired member in electromagnetically coupled relation with said magnet rotor, conductor means connected to said winding and extending through said stem to said craft, and electric means aboard the craft connected to said conductor means for indicating a characteristic of the A.-C. energy generated by said generating means.

2. The system defined in claim 1, wherein said faired member has a flat transverse end face and a pivot shaft projecting aft from said end face, and said hub is mounted for rotation on said shaft and has a flat transverse end face positioned adjacent to and axially spaced from the flat end face of said faired member.

3. The system defined in claim 2, wherein said magnet is positioned within said hub close to said end face thereof and said winding has a magnetic core inductively associated therewith and positioned close to the end face of the faired member so as to define a relatively narrow gap with said magnet.

4. The system defined in claim 3, wherein said magnet includes a pair of parallel similarly poled identical magnet bars disposed on opposite sides of said pivot shaft and a pair of part-circular plates of magnetic material magnetically connected with the poles of said bars and positioned in flat engagement with said hub end wall.

5. The system defined in claim 4, wherein said magnetic core comprises a laminated structure having a U-shaped portion with said winding mounted around the cross-leg thereof and a pair of part-circular portions magnetically connected with the ends of said U-shaped portion and positioned in flat engagement with the end wall of said faired member.

6. A log system comprising a support adapted to be carried submerged in depending relation from a craft, an impeller mounted on said support for rotation in the water, a magnet rotatable with the impeller adjacent said support, an electromagnetic winding carried in said support so as to have alternating energy induced therein on rotation of the magnet, and electric means aboard the craft electrically connected to said winding for indicating a characteristic of said energy, wherein said indicating means comprises a synchronous motor connected for operation by said alternating energy and a totalizing counter driven by the motor.

References Cited by the Examiner

UNITED STATES PATENTS

| 1,305,803 | 6/1919 | Irwin | 73—231 X |
| 2,683,224 | 7/1954 | Cole | 73—231 X |
| 3,003,354 | 10/1961 | Wood | 73—187 |

LOUIS R. PRINCE, *Primary Examiner.*

DONALD O. WOODIEL, *Assistant Examiner.*